UNITED STATES PATENT OFFICE.

JAMES M. TAYLOR, OF INDIANA, PENNSYLVANIA.

IMPROVEMENT IN WRITING-FLUIDS.

Specification forming part of Letters Patent No. 189,813, dated April 17, 1877; application filed January 10, 1877.

*To all whom it may concern:*

Be it known that I, JAMES M. TAYLOR, of Indiana, in the county of Indiana and State of Pennsylvania, have invented certain new and useful Improvements in a Compound called Permanent Ink or Writing-Fluid, of which the following is a specification:

The object of the present invention is to produce a permanent or indelible writing fluid or ink that can be easily and cheaply made, will flow well, will not corrode metallic pens, and will not mold by age; and to this end it consists of a composition of a solution of non-resinous gum or glue and liquid silicate of soda or potash, with suitable coloring material, in the manner now to be more particularly set out and explained.

I first make a solution of any suitable non-resinous gum or glue, (gum tragacanth being preferred,) by dissolving, as far as possible, one ounce in a gallon of soft or distilled water. When the gum is thus dissolved or treated, I add to it four ounces of commercial silicate of soda or potash, and let it stand for several days or weeks, till the sediment settles. Of this I use the clear liquid. To make a black ink or writing-fluid, I dissolve eighty to one hundred grains of aniline-black in one pint of water, (though lamp-black or other black coloring substances may be used.) I then mix one pint of the foregoing solution of non-resinous gum and silicate of soda or potash with this, making one quart of writing-fluid. Heat causes the aniline to dissolve more rapidly, but, in the proportion used, is not essential. A small portion of aniline-blue improves the color of the writing-fluid.

I may use either solution of silicate of soda or potash, and any non-resinous gum or glue now well known for such purposes. Likewise, in coloring matter, I intend to use any that may best suit the fancy or taste.

If I desire to make my ink so that it will answer for copying in letter-press, I intend to add the usual constituents for that purpose, or an additional quantity of gum or glue.

Having thus described my invention, what I consider new, and desire to secure by Letters Patent, is—

In a permanent or indelible writing fluid or ink, the composition consisting of a solution of non-resinous gum or glue and liquid silicate of soda or potash, substantially in the proportion herein described.

In testimony that I claim the foregoing as my own I affix my signature in the presence of two witnesses.

JAMES M. TAYLOR.

Witnesses:
J. M. LAUGHTON,
J. T. KINTZ.